United States Patent
Wojciechowski et al.

(10) Patent No.: US 10,135,929 B2
(45) Date of Patent: Nov. 20, 2018

(54) FAULT-TOLERANT DATA PROCESSING COMPUTER SYSTEM AND METHOD FOR IMPLEMENTING A DISTRIBUTED TWO-TIER STATE MACHINE

(71) Applicant: POLITECHNIKA POZNANSKA, Poznan (PL)

(72) Inventors: Pawel Tomasz Wojciechowski, Poznan (PL); Tadeusz Kobus, Torun (PL); Maciej Kokocinski, Steszew (PL)

(73) Assignee: POLITECHNIKA POZNANSKA, Poznan (PL)

( * ) Notice: Subject to any disclaimer, the term of this patent is extended or adjusted under 35 U.S.C. 154(b) by 151 days.

(21) Appl. No.: 14/995,211

(22) Filed: Jan. 14, 2016

(65) Prior Publication Data
US 2017/0201590 A1    Jul. 13, 2017

(30) Foreign Application Priority Data
Jan. 12, 2016 (EP) .................. 16461501

(51) Int. Cl.
| | | |
|---|---|---|
| G06F 15/16 | (2006.01) | |
| H04L 29/08 | (2006.01) | |
| G06F 11/18 | (2006.01) | |
| G06F 11/14 | (2006.01) | |
| G06F 11/20 | (2006.01) | |

(52) U.S. Cl.
CPC .......... *H04L 67/16* (2013.01); *G06F 11/1425* (2013.01); *G06F 11/1482* (2013.01); *G06F 11/182* (2013.01); *G06F 11/187* (2013.01); *G06F 11/2094* (2013.01); *H04L 67/1095* (2013.01); *H04L 67/1097* (2013.01); *G06F 2201/82* (2013.01)

(58) Field of Classification Search
CPC ....................................................... H04L 67/16
USPC .......................................................... 709/202
See application file for complete search history.

(56) References Cited

U.S. PATENT DOCUMENTS

| | | | | |
|---|---|---|---|---|
| 2003/0083577 | A1* | 5/2003 | Greenberg | A61B 5/7475 600/437 |
| 2014/0344425 | A1* | 11/2014 | Varney | H04L 41/0813 709/221 |

* cited by examiner

*Primary Examiner* — Vivek Srivastava
*Assistant Examiner* — Sibte H Bukhari
(74) *Attorney, Agent, or Firm* — Mark M. Friedman

(57) ABSTRACT

A fault-tolerant data processing computer system and method for implementing a distributed two-tier state machine aimed for distributed (replicated) data stores, in which consistency is maintained despite the failure of any number of replicas and communication paths. In the distributed two-tier state machine, one process (device) in a network of processes (devices) is chosen as the leader, and that leader is responsible for executing functions that return state machine commands, and for broadcasting the commands to the other processes. The processes execute the commands in the logical precedence order that corresponds to the order of function executions that return these commands. The system and method ensures that each of the processes issues exactly the same sequence of commands for execution, such that each command in the sequence, except the first one, has a precedent command on which the command logically depends.

12 Claims, 6 Drawing Sheets

*CommandNo m*

| # | cmd | quorum, | voters | | |
|---|---|---|---|---|---|
| 2 | a | A | B | C | [D] |
| 5 | b | A | B | [C] | E |
| 14 | a | | [B] | D | [E] |
| 27 | b | [A] | | [C] | [D] |
| 29 | b | | [B] | C | D |

Fig. 5

*CommandNo m*

| # | cmd | quorum, | voters | | |
|---|---|---|---|---|---|
| 2 | b | A | | C | [D] |
| 5 | b' | | B | C | [E] |
| 14 | b | [A] | B | | D |
| 36 | b' | | [B] | [C] | E |
| 51 | b' | A | | C | [D] |

*CommandNo n*

| # | cmd | quorum, | voters | | |
|---|---|---|---|---|---|
| 27 | c | [A] | | C | [D] |
| 29 | c' | | B | C | [E] |
| 32 | c | A | B | | [D] |
| 43 | c' | | [B] | [C] | [D] | [E] |
| 54 | c' | [A] | | C | E |

Fig. 6

FAULT-TOLERANT DATA PROCESSING COMPUTER SYSTEM AND METHOD FOR IMPLEMENTING A DISTRIBUTED TWO-TIER STATE MACHINE

TECHNICAL FIELD

The present disclosure relates to a fault-tolerant data processing computer system and a method for implementing reliable distributed computing systems, especially distributed (replicated) data store systems, utilizing a two-tier state machine approach.

BACKGROUND

The present disclosure pertains generally to distributed computing systems and, more particularly, distributed (replicated) data store systems comprising of strongly consistent data store replicas. More precisely and technically, the present disclosure relates to a fault-tolerant data processing computer system and method for implementing a distributed (replicated) two-tier state machine, in which consistency among processes (devices) is maintained despite the failure of any number of processes (devices) and communication paths. The two-tier state machine can be used to build a reliable distributed (replicated) data store system and also other distributed computing systems with modest reliability requirements that do not justify the expense of an extremely fault tolerant, real-time implementation.

From the computer architecture point of view, a distributed data store system is a middleware that can be used by the application programmers to develop any kind of distributed applications. It generally consists of a set of computers, each equipped with a local data store, primitive operations for reading and writing to the local data store, and a protocol for ensuring synchronization among the computers being tailored to the desired functionality (e.g. all or only some data are replicated). A data store is a repository of a set of data objects. These objects are modeled using classes defined in a database schema. A data store is a general concept that includes not just repositories like databases, but also simpler store types such as key-value data repositories, flat files, etc. The programmers can use the primitive operations for reading and writing to the local data store to implement transactions, i.e. blocks of code that operate on the data store with the desired safety properties. A distributed data store system facilitates development of distributed applications, since the programmer has only to implement the application handlers that handle client requests and the application transactions that operate on the store (as required by the requests). Applications can be modified without redesigning the underlying middleware. Moreover, if the underlying data store system can tolerate failures, it is also much easier to develop robust applications. In particular, a fully replicated data store system can continue to provide service even if some of its replicas have crashed and are not recovered yet.

In a system comprising a distributed data store and a client application, there are a number of server computers (servers) connected together in a network in which the servers can send messages to each other. Each server has access to a local data store kept in stable storage that can survive server crashes. On every server, there are many concurrent processes processing client requests and returning responses to the clients. Processing a client request means translation of the request into a transaction that executes some code and returns a result to the client. To increase system robustness and availability, a local data store can be replicated, that is every local store (replica) contains an exact copy of data. Then a client gets the same response no matter which server will process the request. In particular, if a given server is down or slow and does not respond, a client can resubmit its request to another server. In practice, a crashed server can be recovered, meaning that the server is restarted and its state is caught up with the other servers to reflect the current state.

Conventional approaches to implementing fault-tolerant distributed data store systems require some synchronization protocols for maintaining consistency among replicas. However, the synchronization protocols designed in accordance with the prior art have several drawbacks, as explained below.

The two-phase commit protocol (2PC) (described in: Jim Gray. Notes on data base operating systems. In Operating Systems: An Advanced Course, volume 60 of Lecture Notes in Computer Science, pages 393-481, Berlin, Heidelberg, New York, 1978. Springer-Verlag.), a popular consensus protocol known from distributed database systems, generally assumes a single process (a leader) that coordinates all processes. In the first phase, a leader attempts to prepare all the processes to take the necessary steps for either aborting or committing transactions and to vote for a commit or abort. In the second phase, the leader decides to commit the transaction (if all processes have voted for commit) or abort (otherwise). The protocol is not resilient to all possible failure configurations and it is a blocking protocol. After a process has sent a message to the leader, it will block until a commit or rollback is received. If the leader fails permanently, some processes will never resolve their decisions. If both the leader and some process failed, it is possible that the failed process accepted a decision while other processes did not. Even if a new leader is elected, it cannot proceed with the operation until it has received a message from all processes and hence it must block.

The three-phase commit protocol (3PC) (described in: Dale Skeen and Michael Stonebraker. A formal model of crash recovery in a distributed system. IEEE Transactions on Software Engineering, SE-9(3):219-228, May 1983.) is more resilient to faults than the 2PC protocol. It avoids permanent blocking by introducing additional phase, in which the leader sends a preCommit message to other processes. The leader will not send out a decision message (abort or commit) until all processes have acknowledged the preCommit message. The protocol places an upper bound on the amount of time required before a transaction either commits or aborts. This property ensures that if a given transaction is attempting to commit via 3PC and holds some resource locks, it will release the locks after the timeout. Thus, the protocol can make progress in case of failures. However, the original 3PC protocol does not take into account every possible mode of failure. In particular, it is only resistant to node crashes and is vulnerable to e.g. network partitions. A network partition is a failure of the network device that causes a network to be split, so that some processes are not able to communicate.

The enhanced three-phase commit protocol (E3PC) (described in: Idit Keidar and Danny Dolev. Increasing the Resilience of Distributed and Replicated Database Systems. Journal of Computer and System Sciences, 57(3), 309-324, December 1998) alleviates the aforementioned shortcomings of 3PC by introducing a quorum-based recovery phase. However, even though processes are not blocked indefinitely by a failure of some process or a network partition, a transaction's commitment may be significantly delayed. This is because, as in the 2PC and 3PC protocols, a transaction can only commit when all processes accept it. If failures occur, processes may invoke the recovery procedure and elect a new coordinator. If the recovery procedure fails (e.g., due to the crash of some process), it is retried until it will eventually succeed. The final decision on whether to commit or abort a transaction can only be made when the system is fully recovered.

A state machine approach (described in: Leslie Lamport. Time, clocks, and the ordering of events in a distributed system. Communications of the ACM (CACM), 21(7):558-565, July 1978.) is another popular method that can be used to implement distributed data stores and other computing systems that must tolerate failures. A state machine generally consists of a set of states, a set of commands, a set of responses, and a functor that assigns a response/state pair to each command/state pair. A state machine executes a command by changing its state and producing a response, with the command and the machine's current state determining its new state and its response. A state machine can be replicated, as illustrated in FIG. 1. Then, all state machines start from the same state $S_0$ and execute exactly the same sequence of commands $c_1 \ldots c_{k+1}$ (k>0). A distributed computing system consists of several component processes (devices) that are connected by a network. In the distributed state machine approach to building fault-tolerant systems, the component processes (devices) are replicated and synchronized by having every process P1 . . . Pn independently simulate the execution of the same state machine. The state machine is tailored to the particular application, and is implemented by a general algorithm for simulating an arbitrary distributed (replicated) state machine. Problems of synchronization and fault tolerance are handled by this algorithm. When a new system is designed, only the state machine is new.

If additional assumptions are made about the relation between state machine commands, an algorithm implementing a distributed (replicated) state machine can be designed to reflect that relation and to improve performance. For example, commands that have a commutative relationship can be executed in an arbitrary order, thus a state machine could refrain from requiring that all processes obtain all commands in the same order. For example, consider a distributed computing system for maintaining bank accounts of customers. Some actions of different clients can be translated to the state machine commands that commute with one another. E.g., if a client c1 issued a request to deposit $100 into its account at approximately the same time when a client c2 issued a request to withdraw $50 from its account, either command could be performed first, without affecting the final state of the distributed state machine. A method and system for implementing a fault-tolerant distributed state machine that supports commutative commands were described in the European patent EP1659500. However, the approach presented in EP1659500 is not much different from the original state machine, since even though different processes (devices) may obtain the same commands in a different order, the commands still have to be executed sequentially. Moreover, it lacks a general method of deciding by the distributed state machine whether two commands are commutative or not.

Paxos (originally described in: Leslie Lamport. The part-time parliament. ACM Trans. Comput. Syst., 16(2), May 1998, and in the U.S. Pat. No. 5,261,085 under the name of Multiple Command Protocol) is the most popular algorithm for implementing arbitrary state machines. It was successfully used in many practical distributed applications. The general idea of the Paxos protocol can be explained as follows. The state machine commands are chosen through a series of numbered ballots, where each ballot is a referendum on a single command. The state machine commands are numbered consecutively. One of the processes (devices) in the network is designated as a leader, and it sends ballots with proposed commands to the other processes (devices). In each ballot, a process has the choice of either voting for the proposed command or not voting. A process does not vote if it has already voted in a higher ballot. Obviously, a crashed process also does not vote. In order for a ballot to succeed and a command to be issued, a majority set of the processes in the system must vote for it. If less than majority of processes voted for a command, then another ballot has to be conducted. Therefore, a single command can be voted in several ballots. Each ballot is given a unique number, and the majority set is chosen in such manner that the majority sets voting on any two ballots will have at least one process in common (in fact, any two majority sets have at least one process in common). Thus, any command which has been issued will appear in the store of at least one process of any majority set participating in a subsequent ballot. Each issued command is processed by a separate instance (execution) of the protocol. Protocol instances (executions) and issued commands are numbered using natural numbers. An instance n denotes the n'th instance (execution) of the protocol which corresponds to the issued command number n. When a new leader is chosen, messages are exchanged between the new leader and the other processes in the system to ensure that each of the processes has all of the commands that the other processes have. As part of this procedure, any command for which one of the processes has previously voted but does not have a command number is broadcast as a proposed command in a new ballot. The protocol allows a leader to conduct any number of ballots concurrently by running a separate instance of the protocol for each command number.

In the simplest state machine approach, a distributed data store system is implemented with a network of servers that transform transactions into commands of a distributed state machine. Any algorithm used for simulating a distributed state machine, ensures that all servers obtain the same sequence of commands to be executed sequentially, thereby ensuring that they all produce the same sequence of state changes—assuming they all start from the same initial state and the state machine is deterministic (i.e., given the same input it produces the same output). Therefore strong consistency is ensured and network communication is modest (since only commands have to be broadcast). However, in general transactions cannot be executed concurrently on a server (since they must produce the same results on all servers), which does not allow the system to fully utilize the performance of modern multi-core architectures.

In the database state machine approach to building a distributed store system (described in: Fernando Pedone, Rachid Guerraoui, and André Schiper. The database state machine approach. Distributed and Parallel Databases, 14(1):71-98, July 2003), a distributed state machine is only used for transaction commitment. In a distributed (replicated) data store built using this approach, transactions can be executed concurrently, but a transaction commitment procedure is transformed into a state machine command. The command performs two tasks: (1) it decides whether to commit or abort a finished transaction based on updates and other data about transactions (this task is called certification), and (2) it applies the updates to the data store in case of successful certification—otherwise the transaction is aborted. That command is executed, and the state machine response is transformed into a reply to the application, which is sent to it by the server that executed the transaction. The state machine commands are executed sequentially, as in the original state machine approach. Since all servers perform the same sequence of state machine commands, they all maintain consistent versions of the state machine state (which is kept in the local data stores). However, at any time, some servers may have earlier versions than others because a state machine command is not always executed at the same time by all servers.

A distributed data store utilizing the database state machine approach allows for strong consistency and non-blocking concurrency, but it has drawbacks. Firstly, the network communication is not optimal, since the updates and other data of every transaction (which can be large) must be communicated to all servers irrespective of whether this transaction will be decided to commit or abort. This is because these data are required by the first task of the transaction certification procedure performed by the state machine on every server. Secondly, solutions based on selecting one dedicated process to carry out this task (and thus eliminating redundant certification on other servers) resemble the 2PC or 3PC protocols, so have their drawbacks.

Therefore, there is a need to develop a system and a method for implementing fault-tolerant distributed data stores and distributed computing systems utilizing a similar model of computation that will be free from the above drawbacks. The key idea of such a system and method can be explained using a two-tier state machine, which extends the notion of a general state machine in the following way.

A two-tier state machine is a state machine, equipped with a set F of functions, that are intended to be called only by one process (device) which is considered by the other processes (devices) as a leader. Functions return commands intended for the state machine. Functions can be nondeterministic (may return different results each time they are called) and can be executed concurrently. Functions may transform a leader state LS that is associated with a leader process that executes the functions, where LS is separate from a machine state MS of the state machine. Given two functions f and g, the execution of g logically depends on the execution of f (or, g depends on f, for brevity) if the state transformed by g depends on the state transformed by f, with no other function intervening in between and accessing the state of f or g. Given two commands d1 and d2, d2 depends on d1, or in other words d1 precedes d2, denoted d1=>d2, if they were returned by, respectively, functions f and g such that g depends on f. A null command is an abstract command that has no precedent command. A sequence of commands is dependent if given any two commands d1 and d2, such that d1 is directly followed by d2 in this sequence, d1 precedes d2, and the first element of the sequence is the null command. The commands that have been issued for the execution by the two-tier state machine can be executed concurrently with functions, and the following two conditions hold: (1) all the issued commands form a dependent sequence of commands; (2) the state machine must execute a prefix of the dependent sequence of the issued commands with no intervening command in between.

A distributed two-tier state machine can be implemented trivially as an ordinary distributed state machine, by having each function executed by the state machine, and requiring that the result of function execution (a command) is executed by the state machine before any other function can be issued for execution by the state machine. However, this brings no more advantages over a common state machine and requires functions to be deterministic. On the other hand, any naive implementation utilizing a general state machine algorithm to issue commands, in which functions are executed externally by some dedicated process (device) and the order of issued commands is not constrained by the functions returning the commands will be incorrect. This is because the general state machine algorithms (such as Paxos and its variants, e.g. described in the patent publications U.S. Pat. Nos. 5,261,085, 7,565,433, 7,856,502, 7,558,883, and EP1659500) are not able to ensure that the sequence of issued commands is dependent. Moreover, as the concurrent execution of commands and functions is not constrained, the execution of functions can intervene the execution of the sequence of issued commands, thus leading to inconsistencies among local data stores.

Thus there is a need to develop a novel communication protocol that can be used to ensure a fault-tolerant distributed (replicated) two-tier state machine.

SUMMARY

There is disclosed herein a system and method for implementing distributed computing systems, especially distributed data store systems, in which consistency among replicas is maintained despite the failure of any number of devices and communication paths. The system and method is suitable for systems with modest reliability requirements that do not justify the expense of an extremely fault tolerant, real-time implementation. The disclosed approach can be described in detail as Executive Paxos, a fault-tolerant distributed protocol for implementing distributed two-tier state machines. It can be summarized as follows. One device in a network of devices is chosen as the leader, and that leader is responsible for executing functions that return state machine commands, and for broadcasting the commands to the other devices. The devices execute the commands in the logical precedence order that corresponds to the order of function executions that return these commands. The system and method ensures that each of the devices issues exactly the same sequence of commands for execution, such that each command in the sequence, except the first one, has a precedent command on which the command logically depends. The commands are numbered consecutively, and they are recorded in stable storage by the devices. Each command is broadcast through a uniquely numbered ballot, and each device participating in a ballot may either vote to accept the command or not vote. To be issued, a command must be voted for by a majority of the devices in the system and its precedent command in the sequence must have already been issued. Each issued command is stored by each of the devices in the majority set which voted for it, and since any two majority sets must have at least one device in common, any command which has been issued will appear in the store of at least one device of any majority set participating in a subsequent ballot. When a new leader is chosen, messages are exchanged between the new leader and the other devices in the system to ensure that each of the devices has all of the commands that the other devices have. As part of this procedure, any command which is not issued, but has a chance to be issued based on the history of previously issued commands and the logical precedence order relation, for which one of the devices has previously voted but does not have a command number is broadcast as a proposed command in a new ballot.

The protocol disclosed herein removes all the aforementioned drawbacks of the existing protocols aimed for the implementation of distributed (replicated) data stores. Consistency among replicas is maintained despite the failure of any number of devices and communication paths. The issued commands can be executed by several devices, each independently simulating the execution of the same state machine, while functions that return these commands are performed concurrently only by one device chosen as a leader. If the leader crashes, a new leader is automatically singled out and continues processing function calls and producing commands for the state machine. The protocol ensures that the sequence of commands that are issued for the execution by the state machine preserves the dependency of the corresponding functions, i.e. the sequence of issued commands is dependent, despite the failure of any number of devices and communication paths. Thus, by using the system and method disclosed herein the problems of synchronization and fault tolerance are handled by a general algorithm with which devices handle function calls and acquire a sequence of issued commands. This approach greatly facilitates the implementation of distributed computing systems.

In particular, the system and method as presented herein can be easily used to implement a fault-tolerant distributed data store system, utilizing the two-tier state machine approach. The system design is similar to the general database state machine approach described earlier, but a transaction commitment procedure is split into two procedures: a certification function performing transaction certification, and an update command that applies updates consistently to all store replicas. The update commands are executed on every server, while the calls of the certification function, which can be performed concurrently, are handled only by one device chosen to be a leader. The synchronization algorithm simulating the distributed (replicated) two-tier state machine ensures dependency between the executed commands, irrespective of faults that might occur. If the leader fails, then a new leader is chosen automatically.

Distributed (replicated) data store systems implemented using the system and method presented herein combine the following advantages: (1) strong consistency among replicas is maintained despite the occurrence of faults such as a server crash or the loss or duplication of messages exchanged between servers, thus increasing system robustness; (2) transactions can be executed concurrently and without blocking, thus increasing system availability and scalability (especially on multicore processors); and (3) transaction state updates, which can be large, are communicated to each replica only if the updates must be applied (i.e., they are not broadcast if the certification function aborts the transaction), thus saving network bandwidth.

Executive Paxos builds on Multiple Command Protocol (Paxos). Like Paxos, it guarantees that if fewer than a quorum of devices fail then the commands are issued for the execution within a fixed length of time. However, there are also important differences between the two protocols (and also between Executive Paxos and all of the existing variants of Paxos). In particular, some extensions and changes were necessary in order to ensure that: (1) in addition to carrying a process of voting, a leader receives and executes (possibly non-deterministically) functions which return commands that are voted in the ballots; (2) consecutive commands can be voted concurrently in separate instances of the protocol, but the order of issued commands must correspond to the order in which the commands where returned by functions and there must be no gaps in command numbering (as explained below); (3) in a ballot, the leader chooses a command based not only on the most recent votes of the devices in the majority set for this ballot, but also taking into account the dependency relation between commands; (4) to be issued, a command d must not only be voted for by a majority of the devices in the system, but also a command on which d depends must have been issued as a command with one lower command number (unless d is the null command); in other words, the sequence of issued commands must be (logically) dependent.

In Paxos, in the event of gaps in the command numbers, the leader attempts to issue "no-op" commands to fill the gaps, rather than issuing operative commands which would be out of order with respect to when they were introduced. Such gaps might, for example, occur if the system were to shut down after one or more ballots have been initiated but before they are completed. Assume, for example, that commands #125 and #126 are proposed, that all of the devices shut down before they are issued, and that a new leader is chosen the next time the system is active. If all of the devices which voted for command #125 are absent, the new leader could issue command #126 (as required by safety condition B3($\beta$) described later) without ever learning about command #125, thereby creating a gap in the command numbers. Upon discovery, this gap is filled by a "no-op" command with a number #125, which is issued but not executed by the state machine. In Executive Paxos, there are no gaps, so there is no need to issue the "no-op" commands.

The behavior of Paxos described above poses no problem for typical distributed applications utilizing the ordinary state machine approach, where voted messages are mutually independent. For example, consider a distributed data store system utilizing the database state machine approach, where a commitment procedure for a given transaction T is transformed into a state machine command. If this command is lost due to failures and therefore not issued, the commitment procedure for transaction T cannot be accomplished. However, the system will repeat the commitment procedure for T after receiving the "no-op" command, or after a sufficiently long timeout. It is possible that the commitment procedure will then decide to abort transaction T instead of commit (or vice versa), but this scenario does not violate safety.

On the contrary, in a distributed data store system based on the two-tier state machine, the transaction commitment procedure is split into a certification function and an update command, where a sequence of update commands is dependent. Therefore any update command d cannot be executed unless a precedent command (on which d depends) has already been executed. This requirement is ensured by the Executive Paxos protocol. For instance, consider a command c which has been successfully voted within an instance number n, i.e., a majority set of the devices in the system have voted for c (but c is not issued yet). In this protocol, the command c can be issued by the leader only if some command b on which c depends has already been issued in an instance m, where m=n−1. If no command has yet been issued in instance m, or the command issued in instance m was not a precedent command for c, then the leader is not allowed to issue command c. However, if there is another command b' that was proposed in instance m, which depends on the command a on which command b also depends, then if b' will be successfully voted instead of b, then the leader can issue b' instead of b for the instance number m and ignore both b and c (instead, some other command c' which depends on b' may be voted and issued for the instance number n at some later time). Therefore, in Executive Paxos all issued commands are operative commands having consecutive numbers and forming a dependent sequence. There are no gaps that must be filled with any "no-op" commands. In Paxos, in a similar scenario, the leader would immediately issue the successfully voted command c with a number n, and the "no-op" command for instance m.

Features of the disclosed system and method are disclosed in the description below and/or in the claims that follow the description.

BRIEF DESCRIPTION OF DRAWINGS

FIG. 5 is a table illustrating the implementation of one condition of a state machine.

FIG. 6 is a table illustrating the implementation of one condition of a two-tier state machine.

DETAILED DESCRIPTION OF THE PRESENT DISCLOSURE

Figure 3:
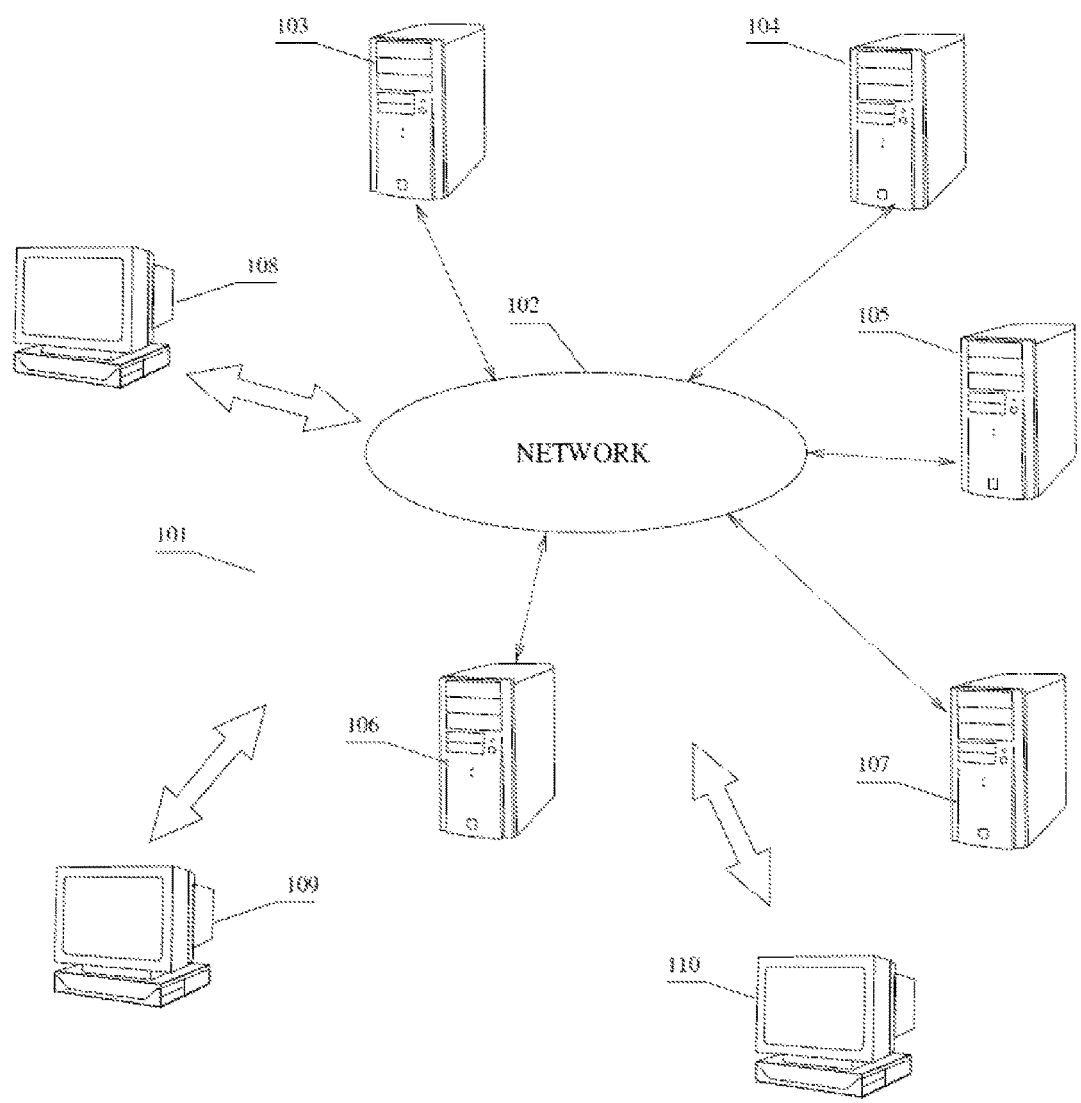
FIG. 3 is a block diagram of one embodiment of a distributed data processing system utilizing a distributed two-tier state machine.

The present disclosure may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices. Distributed Computing Environment For ease of presentation only, the present disclosure will be described with reference to distributed computing systems such as system 101, which comprises server computers 103 through 107, interconnected by a network 102 as shown in FIG. 3. A server computer (a server, in short) or, more generally, a (computing) device handles the client requests by performing the requested task. Servers generally receive requests from client computing devices, execute data retrieval and updates, manage data integrity and dispatch responses to client requests. Each of the servers includes at least a processor and some means of stable storage from which information will not be lost in the event of a crash, a power failure, or the like. The servers may also include other equipment such as input devices, monitors, mass storage devices, printers, etc. The network 102 can be of any suitable type or configuration that permits messages to be sent between any two servers on the network. As will be understood by those skilled in the art, the present disclosure is applicable to all distributed computing environments and is not intended to be limited in any way by the exemplary distributed computing system of FIG. 3, which is simplified for presentation purposes.

FIG. 3 also illustrates client computing devices 108 through 110, though the system and method presented herein is intended to operate in environments having any number of client computing devices. The client computing devices are illustrated as having a generic communicational connection to the distributed computing system 101. As will be known by those skilled in the art, such a communicational connection can use any communication medium and protocol, and can allow the client computing device to communicate with one or more of the computing devices in the distributed computing system 101.

The distributed system 101 is configured to operate a (distributed) data store. A data store is a repository of a set of data objects. These objects are modeled using classes defined in a database schema. A data store is a general concept that includes not just repositories like databases, but also simpler store types such as key-value data repositories, flat files, etc.

Figure 4:
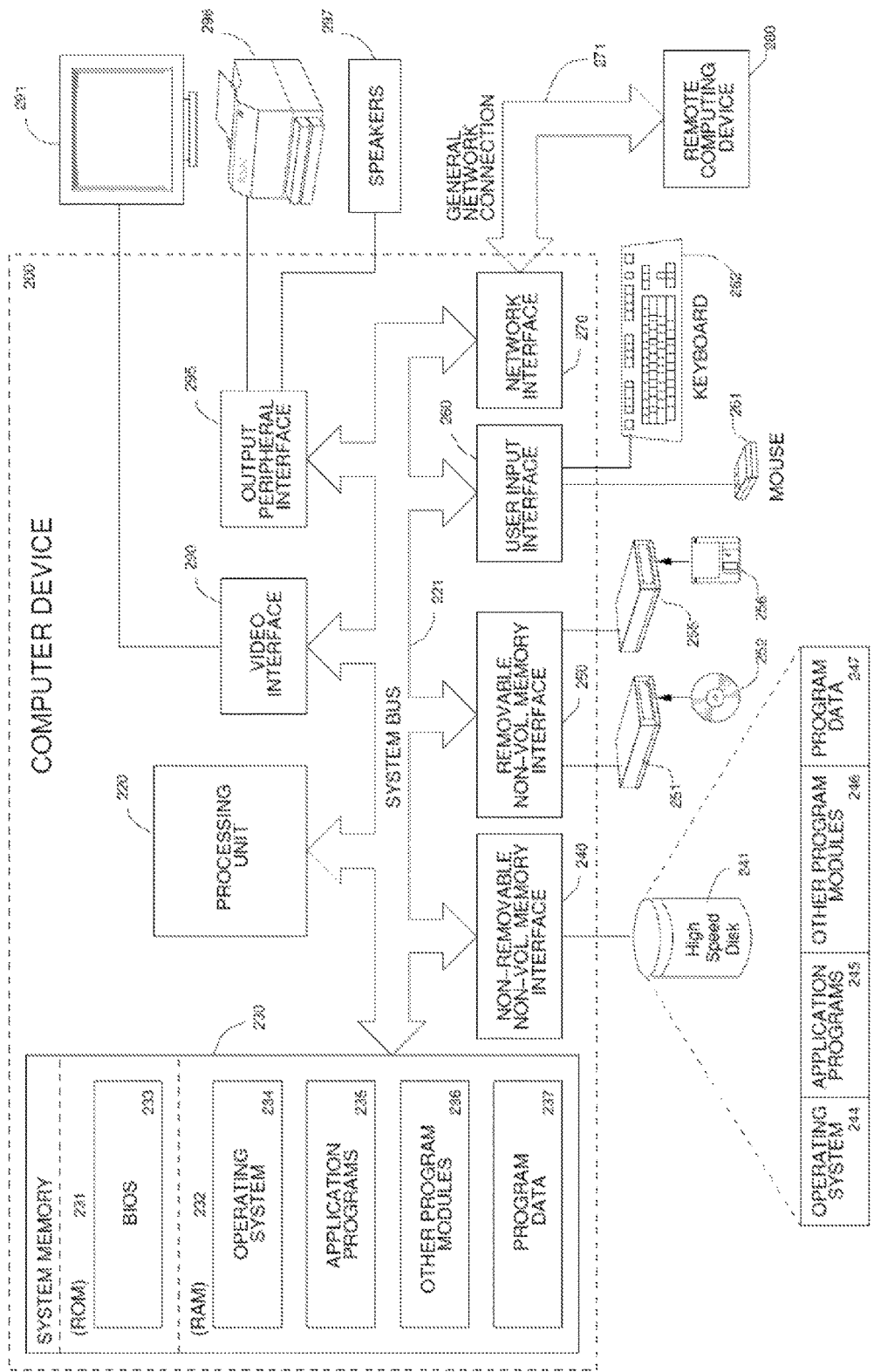
FIG. 4 is a block diagram generally illustrating an exemplary server computer with which an embodiment of the present disclosure can be implemented.

In FIG. 4, an exemplary server computer 200 on which the present disclosure may be implemented is shown. The figure and the description of the server computer 200 below is equivalent to FIG. 2 of the patent EP1659500. The server computer 200 is only one example of a suitable server computer and is not intended to suggest any limitation as to the scope of use or functionality of the present disclosure. In particular, the exemplary server computer 200 shown in FIG. 4, is not intended to exactly represent any of the server computers illustrated in FIG. 3, and it should not be interpreted as having any dependency or requirement relating to any one or combination of peripherals illustrated in FIG. 4.

Components of server computer 200 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Peripheral Component Interconnect (PCI), PCI Express, Accelerated Graphics Port (AGP). Furthermore, the processing unit 220 can contain one or more physical processors.

Server computer 200 typically includes a variety of computer readable media. Computer readable media can be any available media that can be accessed by server computer 200 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by server computer 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 4 illustrates operating system 234, application programs 235, other program modules 236, and program data 237.

The server computer 200 may also include other removable/non-removable, volatile/nonvolatile computer storage media. By way of example only, FIG. 4 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 4, provide storage of computer readable instructions, data structures, program modules and other data for the server computer 200. In FIG. 4, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the server computer 200 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The server computer 200 can operate in a networked environment, such as that shown in FIG. 3, using logical connections to one or more remote computers. FIG. 4 illustrates a general network connection 271 to a remote server computer 280. The general network connection 271, and the network connections illustrated in FIG. 3, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the server computer 200 is connected to the general network connection 271 through a network interface or adapter 270, which can be a wired or wireless network interface card, a modem, or similar networking device. In a networked environment, program modules depicted relative to the server computer 200, or portions thereof, may be stored in the remote memory storage device. It will be appreciated that the network connections shown are exemplary and other means of establishing a communications link between the computers may be used.

In the description that follows, the present disclosure will be described with reference to acts and symbolic representations of operations that are performed by one or more server computers, unless indicated otherwise. As such, it will be understood that such acts and operations, which are at times referred to as being computer-executed, include the manipulation by the processing unit of the server computer of electrical signals representing data in a structured form. This manipulation transforms the data or maintains it at locations in the memory system of the server computer, which reconfigures or otherwise alters the operation of the server computer in a manner well understood by those skilled in the art. The data structures where data is maintained are physical locations of the memory that have particular properties defined by the format of the data.

Although the description herein focuses primarily on the operation of computing devices in a distributed computing system, it will be appreciated that the description is equally applicable to devices running on a single computing device, such as on separate processors, in separate memory spaces, virtual machines, or using other similar programming techniques allowing one physical computing structure to perform the actions described herein as attributed to multiple server computers. Thus, additional embodiments include the operation of the Executive Paxos algorithm in multiple processor environments, irrespective of whether the multiple processors are physically located in one or more computing devices, and also in multiple virtual machine environment, irrespective of whether the multiple virtual machines are being executed by one or more computing devices. Additional features and advantages of the present disclosure will be made apparent from the following detailed description of illustrative embodiments which proceeds with reference to the accompanying figures.

In view of the many possible embodiments to which the principles of the present disclosure may be applied, it should be recognized that the embodiments described herein with respect to the drawing figures are meant to be illustrative only and should not be taken as limiting the scope of present disclosure. For example, those of skill in the art will recognize that some elements of the illustrated embodiments shown in software may be implemented in hardware and vice versa or that the illustrated embodiments can be modified in arrangement and detail without departing from the spirit of the present disclosure. Therefore, the present disclosure as described herein contemplates all such embodiments as may come within the scope of the following claims and equivalents thereof.

Safety Conditions

In order to understand the Executive Paxos protocol as described herein and the differences between this protocol and Paxos, it is helpful to first understand what safety conditions must be satisfied by both protocols in order to ensure consistency.

In Paxos, consistency among the devices is maintained if the following conditions are satisfied:

B1($\beta$): Each ballot in set $\beta$ of ballots has a unique number.
B2($\beta$): The majority sets for any two ballots in set $\beta$ have at least one device in common.
B3($\beta$): For every ballot B in set $\beta$ of ballots, if any device in the majority set voting in ballot B voted in an earlier ballot in set $\beta$, then the command of ballot B is chosen to be the command voted upon in the latest of those earlier ballots.

The implementation of these conditions is illustrated by the example in FIG. 5. This figure and the description following correspond to the ones presented in the U.S. Pat. No. 5,261,085, which describes the Multiple Command Protocol. In the example there are five ballots numbered 2, 5, 14, 27 and 29 and five devices designated A-E. The devices in the majority set for each ballot are indicated, with the devices voting for the ballot being enclosed in boxes. The devices voting for each ballot is a subset of the majority set for the ballot. Ballot #14, for example, has a command a, a majority set consisting of devices B, D and E, and set of voters consisting of devices B and E. Conditions B1($\beta$) and B2($\beta$) are satisfied for each of the ballots because each ballot has a unique number and the majority sets for any two of the ballots have at least one device in common. Condition B3($\beta$) is applied to each of the five ballots as follows:

2. Ballot #2 is the earliest ballot, so the condition on that ballot is trivially true.
5. Since none of the devices in the majority set for ballot #5 voted in an earlier ballot, the condition on that ballot is also trivially true.
14. The only member of the majority set of ballot #14 to vote in an earlier ballot is D, and it voted in ballot #2. Therefore, the condition requires that the command for ballot #14 must equal the command of ballot #2.
27. This is a successful ballot. The members of the majority set for ballot #27 are A, C and D. A did not vote in an earlier vote, the only earlier ballot in which C voted was ballot #5, and the only earlier ballot in which D voted was ballot #2. Since ballot #5 is the later of these two earlier ballots, the condition requires that the command of ballot #27 must equal the command of ballot #5.
29. The members of the majority set for ballot #29 are B, C and D. The only earlier ballot in which B voted was ballot #14, but C voted in ballots #5 and #27, and D voted in ballots #2 and #27. Since the latest of the four earlier ballots on which any of these votes occurred is ballot #27, the condition requires that the command of ballot #29 must equal the command of ballot #27.

The rules governing how the Paxos leader chooses the ballot number, the command and the majority set, and how the other devices decide whether or not to vote in a ballot are derived directly from the need to maintain conditions B1-B3.

To maintain condition B1, each ballot must receive a unique number. By recording in its store the ballots it has initiated, the leader can easily avoid initiating two different ballots with the same number. To keep different devices from initiating ballots with the same number, the set of possible ballot numbers is partitioned among the devices. This can be done, for example, by making each ballot number a pair consisting of two integers, one of which is unique to each device. The pair can be arranged as a decimal, with the integer identified with the device following the decimal point. A device can be said to own those ballot numbers which end in its own unique number.

To maintain condition B2, the majority set for a ballot is chosen to include a majority of the devices in the system. If desired, this can be a weighted majority, rather than an absolute majority, as long as any two majority sets have at least one device in common.

Executive Paxos shares conditions B1 and B2 with Paxos (and they can be maintained as described above), but condition B3($\beta$) is not sufficient. This is because votes in Executive Paxos are chosen not only based on the majority set, but also taking into account dependency between commands.

The execution of functions induces a sequence of dependent commands which are the results of the executed functions. A dependency sequence of a command d is a sequence of dependent commands, such that the null command is the first element and d is the last element of the sequence. For each command d (except the null command), the precedent command of d is the command that immediately precedes d in some dependency sequence induced by the execution of functions. A command d is issued in some instance n (n>0) if it was successfully voted in a ballot in n and d's precedent command had been issued in n−1. A command d is anchored in some instance n if it is issued in n or can be issued in n, i.e. for each instance m less or equal n (0<m<=n) if there is a command issued in m, then this command is an element of the dependency sequence of d.

Then, the third safety condition of Executive Paxos can be formulated as follows:

B3(I,$\beta$): For every ballot B of instance I in set $\beta$ of ballots, if any device in the majority set voting in ballot B voted for some anchored command in an earlier ballot of instance I in set $\beta$, then the command of ballot B is chosen to be the (anchored) command voted upon in the latest of those earlier ballots.

The condition B3(I,$\beta$) is illustrated by the example execution in FIG. 6. The example shows an execution of two concurrent instances of the protocol, numbered with consecutive numbers m and n, where m=n−1. The instance numbers are used to number the issued commands. Suppose that a is a command that was issued within instance m−1 for the command number m−1, where a may or may not be the null command, and there are two alternative proposals of a command for the command (instance) number in, namely b and b'. Both are valid, as a=>b and a=>b'. There are also two alternative proposals of the command for the command (instance) number n, namely c and c', such that b=>c and b'=>c'. Condition B3(I,$\beta$) is applied to each of the ballots as follows:

2. This is the first ballot for m. Device D votes for b and b is a valid proposal since a=>b.
5. Device E votes for b' for m and b' is also a valid proposal since a=>b' and none of the devices in the majority set for ballot #5 voted for other commands in earlier ballots for m.
14. b is the only possible command that can be voted upon, because device D (the only member of the quorum that voted in an earlier ballot) voted for b in ballot #2.

27. This is the first ballot for n. Devices A and D vote for c and c is a valid proposal, since b was voted within instance m, such that b => c and no other command has yet been issued for m.

29. Device E votes for c' for n and c' is a valid proposal, because b' was voted within instance m, such that b'=>c' and no other command has yet been issued for m.

32. c is the only possible command that can be voted upon, because devices A and D (the only members of the quorum that voted in an earlier ballot) voted for c in #27.

36. This is a successful ballot for m. Command b' is the only possible command that can be voted upon, because device E (the only member of the quorum that voted in an earlier ballot) voted for b' in #5.

43. This is a successful ballot for n. In Paxos, c would be the only valid command to be voted upon in this ballot, because D (a member of the quorum in #43) voted for c in ballot #32—the latest ballot of the three earlier ballots within instance n, in which any member of the quorum of #43 voted. However, in Executive Paxos, c cannot be chosen since b (the logically precedent command of c) has not been issued for m, but b'. On the other hand, c' is also a valid proposal for this ballot since the logically precedent command of c' is b' which was issued for m, and E (a member of the quorum in ballot #43) voted for c' in ballot #29. Since no other valid command was voted by the devices in the majority set for ballot #43, c' is issued. If there would be more valid commands to choose from, then the valid command from the latest ballot is chosen.

51. b' is the only possible command that can be voted upon, because device C voted for b' in #36, the latest ballot in which any member of the quorum of #51 voted.

54. c' is the only possible command that can be voted upon, because devices C and E have voted for c' in #43, the latest ballot in which any member of the quorum of #54 voted.

The Executive Paxos Protocol

The Executive Paxos protocol is executed by a network of computing devices. Each device independently simulates the same two-tier state machine, and one of said devices is designated as a leader for sending ballots with proposed commands to the other devices. Any suitable method can be employed for choosing the leader, e.g. using failure detectors that are available to all these devices. A failure detector can be implemented using a heartbeat protocol that relies on timely exchange of messages between devices. A device that fails to respond in a timely fashion may be crashed and, therefore, it is assumed as unreliable by the device implementing the failure detector. Since the failure detector may make mistakes, during unstable periods of computation failure detectors used by different devices may indicate different devices as correct.

Figure 1:
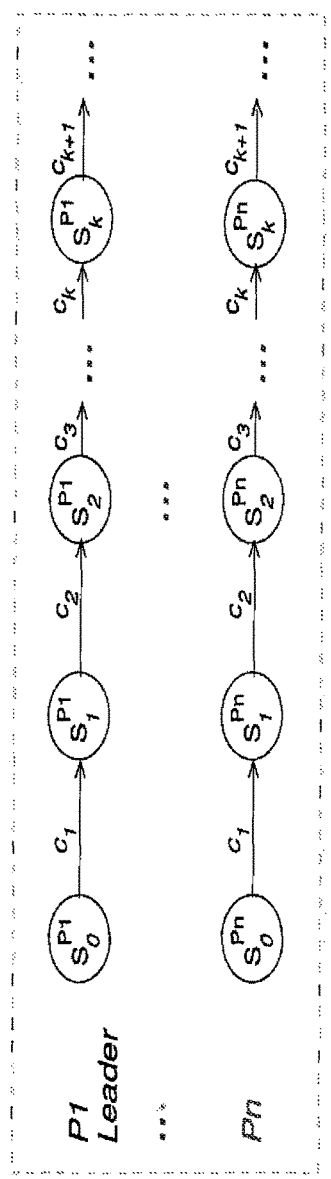
FIG. 1 is a state diagram generally illustrating a distributed (replicated) state machine.
Figure 2:
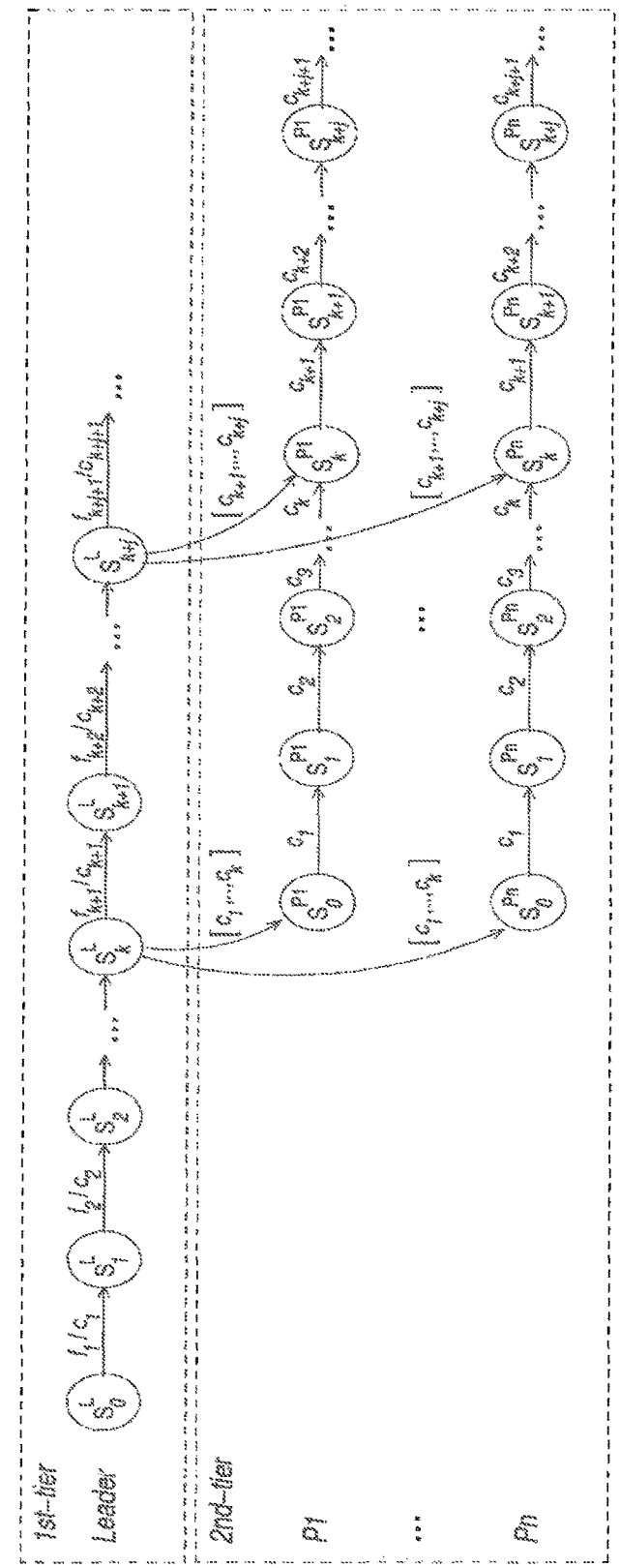
FIG. 2 is a state diagram generally illustrating a distributed (replicated) two-tier state machine.

FIG. 2 illustrates an exemplary distributed (replicated) two-tier state machine, which consists of n devices P1 . . . Pn, each device having the same initial state $S_0$, where device P1 is currently a leader. Every device Pk (k=1 . . . n) may request a function f to be executed by the current leader by sending a message ExecuteFunction(f) to the leader, where f indicates the function to be executed. The requests to execute functions are handled by the leader device in order of appearance, and the commands ci (i=1, . . . ) which are returned as the results of the consecutive function executions fi (i=1, . . . ) are sent to all devices within ballots. Commands being voted are not (necessarily) independent. Therefore each command ci includes the information about the previous command cj (where j=i−1) that logically precedes ci. The execution of command ci (for any i>0) causes the state Sj (where j=i−1) of every device Pk (k=1 . . . n) to be transformed to state Si. It is assumed that a null (abstract, non-existent) command is the precedent command for the first operative command to be issued to the state machine. The null command has a number 0 and is issued.

The Executive Paxos protocol description uses the following notation and data structures:

p, q devices,
b, b' ballot numbers,
m, n protocol instance numbers (or command numbers),
c, d commands,
d(m) an issued command in instance m,
v(m) a vote (a triple of device, ballot number, and command) in instance m,
L a list of all issued commands,
=> the logical dependency (logical precedence) relation,
lastTried(p) the number of the last ballot that p tried to begin, or −∞ if there was none,
nextBal(q) the largest value of b for which q has sent a message BallotInfo, or −∞ if it has never sent such a message,
prevVote(q,m) the vote cast by q in the highest-numbered ballot for command number m in which it voted, or empty if it never voted,
nextCommandNo(p) the number of the next command p is going to propose,
NextBallot(b,n) a message sent by a leader with a new ballot number b for command number n,
BallotInfo(b,D,V,X) a message sent in ballot b by a device q to the leader with q's knowledge on commands issued (D), voted (V), and missing (X),
MyNextBal(b') a message used by q to communicate nextBal(q) to the leader,
BeginBallot(m,b,d) a message sent by a leader to begin a ballot,
Voted(m,b,d) a message sent by a device to indicate its vote,
ExecuteFunction(f) a message with a request to execute function f,
Success(m,d) a message indicating that command d has been issued and is associated with the (instance) number m,
M(p) a local state machine of device p,
LS(p) a temporary leader state of device p acting as the leader.

When a new leader is chosen, the following steps occur in the Executive Paxos protocol:

1. The new leader p sets lastTried(p) to a ballot number b which it owns and which is larger than its previous value and sends a NextBallot(b,n) message to all devices including itself, where n is the smallest command number for which p does not know the corresponding command.

2. Upon receipt of a NextBallot(b,n) message from p with b>=nextBal(q), device q sets nextBal(q) to b and sends a BallotInfo(b,D,V,X) message to p, where:

D is the set of pairs (m,d(m)) with m>=such that q knew that command d(m) was issued for the command number in, V is the set of pairs (m,v(m)) such that: (i) m>=n, (ii) q does not know the issued command for number m, (iii) q has voted in a ballot for command number m, and (iv) v(m) is the most recent vote cast by q in a ballot for command number m, kept in prevVote(q,m), X is the set of command numbers <n for which q does not know the corresponding issued command.

If b<nextBal(q), q sends the message MyNextBal(b') back to p, where b'=nextBal(q).

3. Upon receipt of MyNextBal(b') from any device, if b' is greater than lastTried(p), the leader p chooses a new value of b greater than b' and goes back to step 1.

Upon receipt of BallotInfo(b,D,V,X) messages from a majority of the devices, p adds the commands from each set D to its list L of issued commands, and writes them to stable storage. The leader also sends the other devices any issued commands it knows but they do not according to their BallotInfo messages.

The leader p initiates the temporary leader state LS(p) by copying to it the current state of the state machine M(p) of device p.

For a set Votes of all votes V received in the BallotInfo messages, the leader p executes the following procedure InitHistProc( ) which produces the initial history set H of command numbers m, paired with the corresponding (not yet issued) commands.

The procedure starts from the lowest number m for which the leader does not know the issued command, and proceeds through all consecutive command numbers m for which there exists any ballot in Votes by executing the following steps:

(a) if there exists a vote v(m) with a command c cast in the most recent ballot for command number m, such that the precedent command of c is either the command which has been issued with number m−1 or is in H (paired with m−1), then the leader adds (m,c) to H and assigns m+1 to nextCommandNo(p), (b) if there is no such a suitable vote, device p ends procedure InitHistProc( ).

The leader p executes on the temporary leader state LS(p) all the commands from H according to the order of command numbers (unless they were already executed by the state machine M(p) before leader state LS(p) was initiated).

3'. For every pair (m,d) in the leader's initial history set H according to the order of command numbers in, the leader p executes a ballot to broadcast command d for command number m, as follows:

(c) p chooses some majority set Q of devices from among those from which it has received BallotInfo messages for the current value of lastTried(p), (d) p sends a message BeginBallot(m,b,d) to every device in set Q, where b=lastTried(p).

3". If the leader p had received the ExecuteFunction(f) message, function f is executed on the temporary leader state LS(p), altering LS(p), and returning some command d.

Next, the leader p executes a ballot on command d for command number nextCommandNo(p) by executing steps 3'(c) and 3'(d), and then increments nextCommand-No(p).

Steps 3' and 3" can be executed concurrently.

4. Upon receipt of a message BeginBallot(m,b,d) with b=nextBal(q), device q casts a vote for the command d in ballot number b, i.e. it records that vote in prevVote(q,m) kept in stable storage, and sends a Voted(m,b,d) message back to p.

5. When p receives Voted(m,b,d) messages back from every device in the majority set Q, and p knows that the precedent command of d has been issued for command number m−1, it considers command d to be successfully issued, so it records d in its stable storage, and it sends a message Success(m,d) to all devices.

6. Upon receiving the Success(m,d) message, a device q records command d in its stable storage.

Figure 7A:
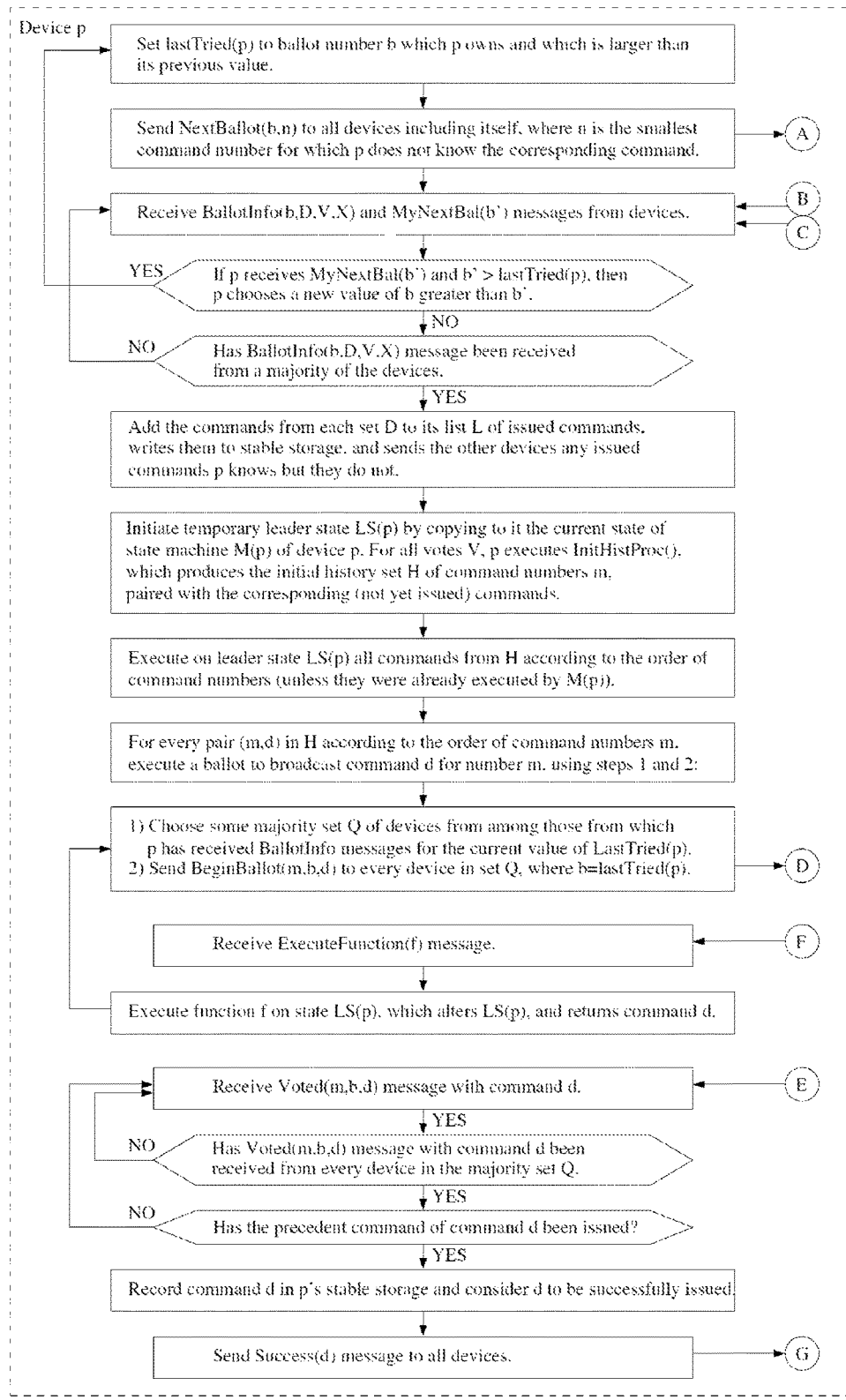
FIGS. 7a and 7b comprised together is a flow chart illustration of aspects of an embodiment of the Executive Paxos protocol.
Figure 7B:
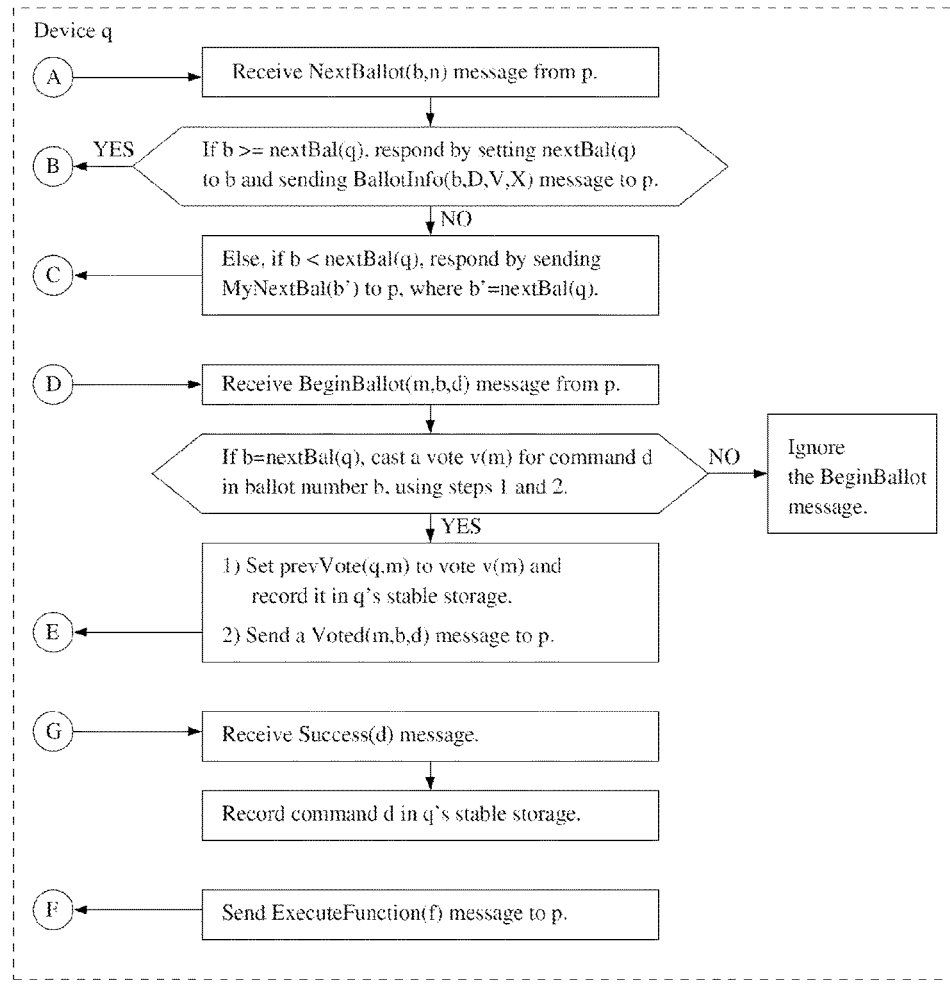

Aspects of an embodiment of the Executive Paxos protocol are illustrated in FIGS. 7a and 7b.

Steps 1-4 contain the protocol for initiating a ballot and voting on it. In step 5, the results of the balloting are determined, and in step 6 the command is declared to be issued.

In step 1 of this protocol, a leader device p is informing the other devices that it has all of the previously issued commands with numbers less than n, and in step 2, each of the other devices q informs p of all commands it already has with numbers equal to or greater than n, and it asks p to send it any commands which q does not have with numbers less than n.

When the new leader has received a reply from every member of a majority set, it is ready to perform either step 3' or step 3" for each new instance of the protocol. For some finite number of instances (command numbers), the choice of commands decided by InitHistProc( ) in step 3 will be determined by condition $B3(I,\beta)$. The leader p immediately performs step 3' for each of those instances to try passing these commands. Thereafter, whenever p receives a request to execute a function and issue a command returned by the function, it chooses the lowest command number that it is still free to choose (stored in nextCommandNo(p)), and it performs step 3" for that command number (instance of the protocol) to try to issue the command.

In step 2, if a device q receives a message from a leader device p, with a ballot number that is lower than the largest ballot number b' for which q has replied to some leader device, then q sends b' to p. To optimize the protocol, the same conditional statement can also be executed by device q in step 4.

In step 4, a device has the option not to vote. In fact, all the steps in this protocol are optional, i.e. the correctness of the protocol is not compromised when some steps of the protocol are not executed by some devices since they crashed or messages were lost. Failure to take an action can prevent progress, but it cannot cause any inconsistency because it cannot make the conditions $B1(\beta)$, $B2(\beta)$, and $B3(I,\beta)$ false. Since the only effect not receiving a message can have is to prevent an action from happening, message loss also cannot cause inconsistency. Thus, the protocol guarantees consistency even if a computer fails or messages are lost.

The protocol allows any device to initiate a new ballot at any time. Each step maintains the conditions $B1(\beta)$, $B2(\beta)$ and $B3(I,\beta)$, so the entire protocol also maintains these conditions. Since a device enters a command in its permanent storage only if it is the command of a successful ballot, consistency among the devices is maintained. In the protocol, each device also records the number of every ballot it initiates, and every vote it casts.

If a single leader is selected for all these instances, it is necessary to perform the first three steps of the protocol (steps 1-3) just once—when a new leader is chosen.

The leader does not need to broadcast the Success(m,d) messages (step 6) in case devices send Voted(m,b,d) message (step 4) not only to the leader, but to all of the devices, so that they can make the decision to consider d to be successfully issued on their own (step 5).

Devices notify the leader about missing issued commands by sending the BallotInfo(b,D,V,X) message with X containing the numbers of missing issued commands. In return, the leader replies with messages containing the missing issued commands. The same effect can be achieved by a catch-up mechanism which is orthogonal to the core of the protocol. Then, a device does not ask the leader for the issued commands, but acquires the missing commands from its peers, thus reducing the load of the leader. The catch-up mechanism also facilitates the recovery of failed devices that can use it to be up to date with the most recently issued commands.

As in Paxos, each device q must keep lastTried(q), nextBal(q), and prevVote(q) in stable storage, together with the sequence L of all commands issued so far. However, instead of keeping the sequence of all commands issued, a device can keep the current state, the command number of the last command reflected in that state, and a list of the recently issued commands. When a failed device is restarted, it can update its data by copying the state and/or list of recently issued commands from any other device.

The devices use stable storage to facilitate the process of recovery from crash. However, under certain assumptions about the maximal number of crashes that may occur at the same time—typically less than half of the devices are crashed at any given time, the use of stable storage can be eliminated altogether through careful coordination with other devices during recovery.

Progress will be guaranteed by Executive Paxos if the following two requirements are met: (1) If no device fails or restarts, then after some time T, exactly one device in the system considers itself to be the leader; (2) Upon receipt of the ExecuteFunction(f) message with a request to execute function f, the leader may either immediately execute f, or postpone its execution. However, every request to execute f will be eventually handled by the leader and the command returned by the function voted (unless another device becomes the leader in the meantime, in which case the ExecuteFunction(f) message has to be sent again to that new leader). If the two requirements are met, then after time T+delta (for some delta), if majority of devices are active, then every proposed command will be promptly recorded in stable storage of every device in the majority set.

The leader does not need to copy the whole current state of the state machine M(p) (step 3). Instead, the leader may utilize a more efficient method which, for example, stores in the temporary leader state LS(p) only the differences in state compared to the state of state machine M(p), where the differences stem from the execution of functions.

It is apparent from the foregoing that a new two-tier distributed state machine and method have been provided. While only certain presently preferred embodiments have been described in detail, as will be apparent to those familiar with the art, certain changes and modifications can be made without departing from the scope of the present disclosure as defined by the following claims.

Example Applications of the Executive Paxos Protocol
Supply Chain Management System Below is an example of the intended use of the Executive Paxos protocol. Consider a global e-commerce company that runs a network of automated warehouses. Goods need to be transferred (transported) between warehouses and between sections of a single warehouse. The goods are eventually shipped to the customers of the company from the most convenient warehouse. To keep track of all the logistic operations, the company uses a supply chain management system, which relies on distributed devices, each one associated with one warehouse or its section. The system uses the Executive Paxos protocol described herein in order to ensure that the correct record of all goods stored in warehouses is always available and is consistent on every device, despite of any crashes of some devices or network failures, as long as a quorum of devices is not faulty.

Before any operation can be performed in the warehouses, it needs to be registered with the system. Only then the actual goods can be moved around the warehouses. In particular, the system receives requests to register incoming goods (when delivered by external vendors), to register transfer of goods between the company's warehouses or their sections, and to register outbound shipment of goods to customers. The requests to the system are translated into the requests (calls) to execute the following functions by the distributed two-tier state machine, implemented using the Executive Paxos protocol:

inbound(X, v)—to deposit the amount v of goods in warehouse X,
outbound(X, v)—to withdraw the amount v of goods from warehouse X,
transfer(X, Y, v)—to transfer the amount v of goods from warehouse X to warehouse Y.

Function calls are handled by a leader device that executes the functions and transforms the results of function execution into the state machine commands that assign concrete values to variables representing a given warehouse. For simplicity, the example considers only one type of goods and three, initially empty, warehouses (or sections of a single warehouse) that correspond to variables A, B and C. The amount of goods stored in each warehouse is represented as an integer value, initially equal to 0. If B is equal to 350, it means that at this moment there are 350 units of goods in warehouse B. The variables A, B and C are stored on servers denoted as devices p, q and r. For resiliency, every variable is replicated on every device.

Figure 8:
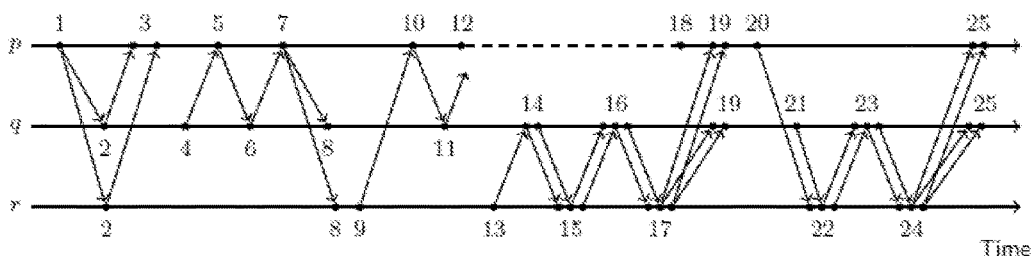
FIG. 8 is a timing chart illustrating an exemplary execution of the supply chain management system built using an embodiment of the present disclosure.

FIG. 8 shows the time chart of an example execution of the system, where arrows represent the unidirectional communication of protocol messages between two given devices. For clarity, messages sent by a device to itself are omitted. The events that occur upon message receipt or message sending are described below.

1. Device p decides to become the leader device, so p sends the NextBallot(17, 1) message to all other devices thus initiating the protocol for instance 1 (no commands have been issued before) with ballot number 17 (some unique ballot number chosen by p).
2. Devices respond with the BallotInfo(17, 0, 0, 0) messages, indicating that
   a. q and r have no knowledge of any issued commands that p is not aware of,
   b. q and r have not previously cast any votes that p has to account for,
   c. there are no issued commands that p is aware of and either q or r are missing.
3. Upon reception of the BallotInfo messages, p creates LS(p) as a copy of M(r) and initiates the InitHistProc procedure. The procedure constructs an empty initial history H. Since H is empty, p needs to take no further actions at this point. Device p is now the leader device.
4. In response to a request to the system, device q wants to execute a function f=inbound(A, 500). Since q is not the leader, q sends a request to p (the current leader device) to execute f.
5. The leader device p receives the request to execute function f and subsequently executes it. Function f is executed on the leader state LS(p), in which the value of A is 0 (the initial value). The function changes the value of A in the leader state LS(p) to 500 and returns command df consisting of one instruction {set the value of A to 500;} which, when executed, sets the value of A to 500 on a given state machine. In order to issue df, p starts a new ballot with number 17 and instance number 1. The leader device p sends a message BeginBallot(1, 17, df) to the majority set Q={p, q}, which constitutes the majority of devices.

6. The devices from the set Q respond with message Voted(1, 17, df). The devices vote for the command df. Since they did not vote in any other ballot in this instance, doing so does not violate the rule B3(I,β).
7. Upon receipt of the Voted messages, the leader device p marks df as issued and sends Success(1, df) message to all devices.
8. Upon reception of message Success(1, df), all devices issue df, which means, they execute it on their state machines M(p), M(q) and M(r). Therefore, A is equal to 500 on every state machine.
9. In response to a request to the service, device r wants to execute a function g=transfer(A, B, 100). Since r is not the leader, r sends a request to p (the current leader device) to execute g.
10. The leader device p receives the request to execute function g and subsequently executes it as dependent on the execution of function f. Function g is executed on the leader state LS(p), in which the value of A is 500 and the value of B is 0 (the initial value). The function changes the value of A in the leader state to 400 and the value of B in the leader state to 100 and returns command dg consisting of two instructions {set the value of A to 400; set the value of B to 100;}. The command, when executed, sets the value of A to 400 and sets the value of B to 100 on a given state machine. In order to issue dg, p starts a new ballot with number 17 and instance number 2. The leader device p sends a message BeginBallot(2, 17, dg) to the majority set Q={p, q}, which constitutes the majority of devices.
11. The devices from the set Q respond with messages Voted(2, 17, dg). The devices vote for the command dg. Since they did not vote in any other ballot in this instance, doing so does not violate the rule B3.
12. Before the current leader p receives the Voted messages, p crashes. Note that dg is not yet issued.
13. Device r decides to become the leader device, so r sends the NextBallot(21, 2) message to q (p is crashed) thus initiating the protocol for instance 2 (r is aware that a command df has been issued for instance 1) with ballot number 21 (some unique ballot number chosen by r, such that the number is greater than any other ballot number r is aware of).
14. Device q responds with BallotInfo(21, 0, {(q, 2, 17, dg)}, 0) message thus indicating that:
    a. q has no knowledge of any issued commands that r is not aware of,
    b. q has previously cast a vote on command dg for instance 2 in ballot number 17,
    c. there are no issued commands that r is aware of and q is missing.

Additionally, in response to a request to the service, device q wants to execute a function h=transfer(A, B, 100). Since q is not the leader, q sends a request to r (which already initiated the procedure to become the leader) to execute h.
15. Upon reception of the BallotInfo message, r creates LS(r) as a copy of M(r) and initiates the InitHistFroc procedure. The procedure constructs an initial history set H={(2, dg)}. Since H is not empty, r executes dg on its leader state LS(r) and sets the value of A to 400 and the value of B to 100. Then r initiates a new ballot to finish voting on dg. To this end, r sends a message BeginBallot(2, 21, dg) to the majority set Q={q, r}, which constitutes the majority of devices. Device r is now the leader device. In the mean time, r receives the request to execute function h and subsequently executes it as dependent on the execution of function g. Function h is executed on the leader state LS(r), in which the value of A is 400 and the value of B is 100. The function changes the value of A in the leader state to 300, the value of B in the leader state to 200 and returns the command dh consisting of two instructions {set the value of A to 300; set the value of B to 200;}. The command, when executed, sets the value of A to 300 and sets the value of B to 200 on a given state machine. In order to issue dh, r starts a new ballot with number 21 and instance number 3. The leader device r sends a message BeginBallot(3, 21, dh) to the set Q={q, r}, which constitutes the majority of devices. Starting ballots on dg and dh is done concurrently.
16. The devices from the set Q respond with messages Voted(2, 21, dg) and Voted(3, 21, dh). The device q votes for the command dg. Since q voted for this command in an earlier ballot for instance 2, q does not violate the rule B3. The device r did not vote for any command in instance 2, therefore it is free to vote for dg for this instance as well. Neither q nor r voted for any command for instance 3, therefore they vote for dh in that instance.
17. Upon receipt of the Voted messages, the leader device r marks dg and dh as issued and sends the Success(2, dg) and Success(3, dh) messages to all devices.
18. Device p recovers after crash and rejoins the computation.
19. Upon receipt of messages Success(2, dg) and Success(3, dh), all devices issue dg and dh, which means they execute them on their state machines M(p), M(q) and M(r) in the order of command numbers. Therefore, on every state machine A is equal to 300 and B is equal to 200.
20. In response to a request to the service, device p wants to execute a function k=transfer(A, C, 500). Since p is not the leader, p sends a request to r (the current leader device) to execute k.
21. In response to a request to the service, device q wants to execute a function l=transfer(B, A, 200). Since q is not the leader, q sends a request to r (the current leader device) to execute l.
22. The leader device r receives the requests to execute functions k and l and subsequently executes them. Note that for both functions to execute without errors, l has to be executed before k (otherwise, the execution of k would fail since there would be no sufficient amount of goods to perform a transfer). Assume that the leader device r first executes function l, as dependent on the execution of function h, and then k, as dependent on the execution of function l (see below for a discussion on the order of function executions). The function l is executed on the leader state LS(r), in which the value of A is 300, the value of B is 200 and the value of C is 0 (the initial value). The function changes the value of A in LS(r) to 500, the value of B in LS(r) to 0 and returns a command dl consisting of two instructions {set the value of A to 500; set the value of B to 0;}. The command, when executed, sets the value of A to 500 and sets the value of B to 0 on a given state machine. Then the function k is executed on the leader state LS(r). The function changes the value of A in LS(r) to 0, the value of C in LS(r) to 500 and returns a command dk consisting of two instructions {set the value of A to 0; set the value of C to 500;}. The command, when executed, sets the value of A to 0 and sets the value of C to 500 on a given state machine. In order to issue dl and dk, r starts new ballots with number 21 and instance numbers 4 and 5. The leader device r sends messages BeginBallot(4, 21, dl) and BeginBallot(5, 21, dk) to the set Q={q, r}, which constitutes the majority of devices.

23. The devices from the set Q respond with messages Voted(4, 21, dl) and Voted(5, 21, dk). Neither q nor r voted for any commands for instances 4 or 5, therefore they are free to vote for dl and dk for those instances without violating the rule B3.

24. Upon receipt of the Voted messages, the leader device r marks dl and dk as issued and sends the Success(4, dl) and Success(5, dk) messages to all devices.

25. Upon receipt of messages Success(4, dl) and Success(5, dk), all devices issue dl and dk, which means they execute them on their state machines M(p), M(q) and M(r) in the order of command numbers. Therefore, on every state machine A is equal to 0, B is equal to 0 and C is equal to 500.

Constructing the initial history out of the information obtained from other devices and maintaining the leader state for function execution is crucial for ensuring correctness. If Paxos were used instead of Executive Paxos, and the leader failed in the middle of step 22, just after sending messages BeginBallot for dk, but before sending messages BeginBallot for dl, instead of command dl a "no-op" command could be issued. Then, however, command dk would be issued and its dependent command dl would not be issued. This would lead to an incorrect state where A would equal 0, B would equal 200, and C would equal 500.

In the example, it is assumed that function l executes before k and therefore both functions are executed without errors. Had they been executed in a different order, execution of function k would fail as there would be no sufficient amount of goods to perform the transfer. In such a case function k would have to be resubmitted at some point in hope that its execution succeeds. In Executive Paxos, the leader does not need to execute functions in the order of their receipt. Then, if the leader received several function calls approximately at the same time, it may analyze them and choose the order of function executions that yields the best results, so that most of the commands are successfully completed. This way the Executive Paxos protocol may reduce the number of times functions are submitted to the system and executed, thus reducing the utilization of CPU and limiting the network congestion, contrary to other solutions that cannot provide the same advantages.

The presented example of the usage of Executive Paxos has been tailored to a specific application. In practice, applications such as the supply chain management system do not need to use the Executive Paxos protocol directly. Instead, they may rely on a distributed data store middleware system that occupies a position in a hierarchy between the operating system and the applications. Then, A, B, C would be just three variables kept in the distributed (replicated) data store and the functionality of the supply chain management system would be implemented as three transactions, each corresponding to one of the functions defined earlier. Then, upon receipt of a request to the system, an appropriate transaction would be executed locally by device that received the request, and the results of transaction execution would be sent to the leader to certify the transaction. In case of the certification were successful, the transaction updates of the data store would be consistently applied by all devices to their local data stores. Otherwise, the transaction would have to be re-executed.

Other applications of the system and method presented herein include any systems with partially or fully replicated data in which concurrent requests to access these data need to be synchronized in a strongly consistent fashion. For example, computer aided collaborative tools may delegate to the leader device the process of resolving conflicts between concurrent updates on the same document, thus allowing for reduced CPU utilization and limited network congestion. In this case, functions would represent changes made by different users (clients) on a document or a group of documents. The role of the leader would be to merge the changes and produce new versions of the documents, which then can be safely stored on all client devices. The benefits of the present disclosure can be even more evident when used for building massive-scale multiplayer games. Similarly, as in the computer aided collaborative tools, multiple users (clients) access and modify shared resources concurrently. More precisely, the users immersed in the virtual world interact with each other and with the world in which their avatars exist, so their actions need to be reflected in the game environment. Because of the highly interactive nature of this process the requirements on real-time evaluation are even tighter. When such systems would be implemented as distributed two-tier state machines, the users would send their actions, expressed as functions, to the leader device. Then the leader would execute them on its leader state to obtain a consistent set of gradual changes to the game environment. These changes or state updates would then be send to all other devices as commands to persist the changes and to make them visible to the users on their local devices.

The invention claimed is:

1. A fault-tolerant data processing computer system utilizing a two-tier state machine aimed for distributed data stores, the system comprising:
   a network of computing devices having functions and consecutively numbered commands,
   one of said devices being designated as a leader for sending proposed commands to the other devices in ballots for a given command number,
   wherein each of the devices includes a processing unit having at least one processor, the processing units of the devices collectively configured:
      to define a majority set of the devices such that any two majority sets selected in a similar manner will have at least one device in common,
      to send a message from the leader to the other devices in the majority set to indicate that the leader is going to propose commands,
      to send reply messages from the other devices in the majority set to the leader identifying the most recent ballots for given command numbers in which they have voted, such that the commands for the given command numbers are not yet issued,
      in response to the reply messages from the devices in the majority set, to send a ballot to the devices in the majority set for a given command number on some command voted for in a previous ballot for said command number, such that the command for said command number is not yet issued,
      in response to the reply messages from the devices in the majority set, to send a ballot to the devices in the majority set on a command for some command number for which no commands have yet been proposed,
      to exchange votes between the devices, and to ensure that all devices agree a command is issued,
      wherein the two-tier state machine is equipped with a set of functions, that are intended to be called and executed only by the leader; wherein the functions transform a leader state that is associated with the leader that executes the functions; wherein the leader state is separate from a machine state of the two-tier state machine; wherein the functions return commands intended for the state machine; wherein the commands that have been issued for an execution by the two-tier state machine are executable concurrently with the functions; wherein all the issued commands form a dependent sequence of commands; and wherein the two-tier state machine is configured to execute a prefix of the dependent sequence of the issued commands with no intervening command in-between, and wherein said commands are being the results of executing said functions by some computing device, where the order of function executions determines the logical precedence between commands, and wherein said leader is designated also for executing functions, and wherein the response to the reply messages for sending a ballot for a given command number on some command voted for in a previous ballot, includes choosing the command that was identified as being the one most recently voted for in a previous ballot for said command number, such that declaring said command as issued does not break the logical dependency between issued commands, or if there is no such command, choosing any arbitrary command, and wherein the processing units of the devices are collectively configured to ensure that all devices agree a command is issued and to require that:
(i) the devices in the majority set voted for the proposed command in some ballot, and
(ii) the precedent command of the proposed command was issued, in the event the proposed command is not to be issued for the first command number, and wherein the response to the reply messages for sending a ballot for a given command number on some command voted for in a previous ballot, and the response to the reply messages for sending a ballot for a given command number for which no commands have yet been proposed, are independent and can be active at the same time.

2. The system of claim 1, wherein the processing units of the devices are collectively configured:
to exchange votes between the devices and to ensure that all devices agree a command is issued, which includes:
(i) sending messages from the other devices to the leader to vote for said command,
(ii) sending a success message to the devices in the majority set to declare the command as issued, if:
(a) votes from the devices in the majority set were received, and
(b) the precedent command of said command was issued, in the event said command is not voted for the first command number,
(iii) declaring the command as issued upon receipt of a success message.

3. The system of claim 1, wherein the processing units of the devices are collectively configured:
to exchange votes between the devices and to ensure that all devices agree a command is issued, which includes:
(i) exchanging messages between the devices to vote for said command,
(ii) declaring the command as issued if:
(a) votes from the devices in the majority set were received, and
(b) the precedent command of said command was issued, in the event said command is not voted for the first command number.

4. The system of claim 1, wherein the processing units of the devices are further collectively configured:
to send a catch-up message from a device to other device or devices indicating any command numbers for which said device does not have an issued command, and
in response to the catch-up message, to send reply messages from the other device or devices to said device indicating any issued commands the other device or devices have for command numbers indicated by the catch-up message.

5. The system of claim 1, wherein the processing units of the devices are further collectively configured:
to prevent the leader from sending a proposed command until all previously proposed commands up to a predetermined number prior to the proposed command have been issued.

6. The system of claim 1, wherein the commands are recorded in stable storage.

7. A method of implementing a fault-tolerant data processing computer system utilizing a two-tier state machine aimed for distributed data stores, with a network of computing devices having functions and consecutively numbered commands, one of said devices being designated as a leader for sending proposed commands to the other devices in ballots for a given command number, the method comprising the steps of:
defining a majority set of the devices such that any two majority sets selected in a similar manner will have at least one device in common,
sending a message from the leader to the other devices in the majority set to indicate that the leader is going to propose commands,
sending reply messages from the other devices in the majority set to the leader identifying the most recent ballots for given command numbers in which they have voted, such that the commands for the given command numbers are not yet issued,
upon receipt of the reply messages from devices in the majority set, sending a ballot for a given command number to the devices in the majority set on some command voted for in a previous ballot for said command number, such that the command for said command number is not yet issued,
upon receipt of the reply messages from devices in the majority set, sending a ballot to the devices in the majority set on a command for some command number for which no commands have yet been proposed,
exchanging votes between devices,
ensuring that all devices agree a command is issued,
wherein the two-tier state machine is equipped with a set of functions, that are intended to be called and executed only by the leader; wherein the functions transform a leader state that is associated with the leader that executes the functions; wherein the leader state is separate from a machine state of the two-tier state machine; wherein the functions return commands intended for the two-tier state machine; wherein the commands that have been issued for an execution by the two-tier state machine are executable concurrently with the functions; wherein all the issued commands form a dependent sequence of commands; and wherein the two-tier state machine is configured to execute a prefix of the dependent sequence of the issued commands with no intervening command in-between,
and wherein said commands are being the results of executing said functions by some computing device, where the order of function executions determines the logical precedence between commands, and wherein said leader is designated also for executing functions, and wherein the step of sending a ballot for a given command number on some command voted for in a previous ballot, include choosing the command that was identified as being the one most recently voted for in a previous ballot for said command number, such that declaring said command as issued does not break the logical dependency between issued commands, or if there is no such command, choosing any arbitrary command, and wherein the step of ensuring that all devices agree a command is issued includes requiring that:
(i) the devices in the majority set voted for the proposed command in some ballot, and
(ii) the precedent command of said command was issued, in the event said command is not to be issued for the first command number, and wherein the step of sending a ballot for a given command number on some command voted for in a previous ballot, and the step of sending a ballot for a given command number for which no commands have yet been proposed, are independent steps and can be performed at the same time.

8. The method of claim 7, wherein the steps of exchanging votes between the devices and ensuring that all devices agree a command is issued include:
(i) sending messages from the other devices to the leader to vote for said command,
(ii) sending a success message to the devices in the majority set to declare the command as issued if:
(a) votes from the devices in the majority set were received, and
(b) the precedent command of said command was issued, in the event said command is not voted for the first command number, and
(iii) upon receipt of a success message, declaring the command as issued.

9. The method of claim 7, wherein the steps of exchanging votes between the devices and ensuring that all devices agree a command is issued include:
(i) exchanging messages between devices to vote for said command,
(ii) declaring the command as issued if:
(a) votes from the devices in the majority set were received, and
(b) the precedent command of said command was issued, in the event said command is not voted for the first command number.

10. The method of claim 7, further comprising the steps of:
sending a catch-up message from a device to other device or devices indicating any command numbers for which said device does not have an issued command, and
upon receipt of the catch-up message, sending reply messages from the other device or devices to said device indicating any issued commands the other device or devices have for command numbers indicated by the catch-up message.

11. The method of claim 7, further comprising the step of:
preventing the leader from sending a proposed command until all previously proposed commands up to a predetermined number prior to the proposed command have been issued.

12. The method of claim 7, wherein the commands are recorded in stable storage.

* * * * *